Dec. 26, 1950   M. STUBNITZ   2,535,463
AUTOMOBILE SEAT
Filed Oct. 23, 1947   3 Sheets-Sheet 1
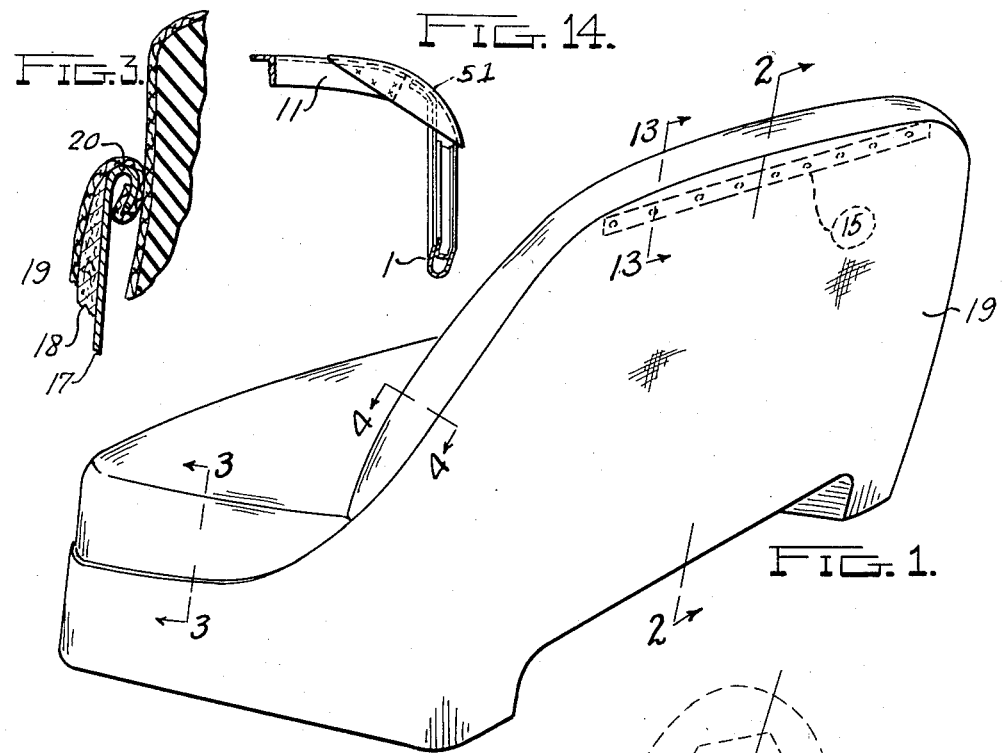
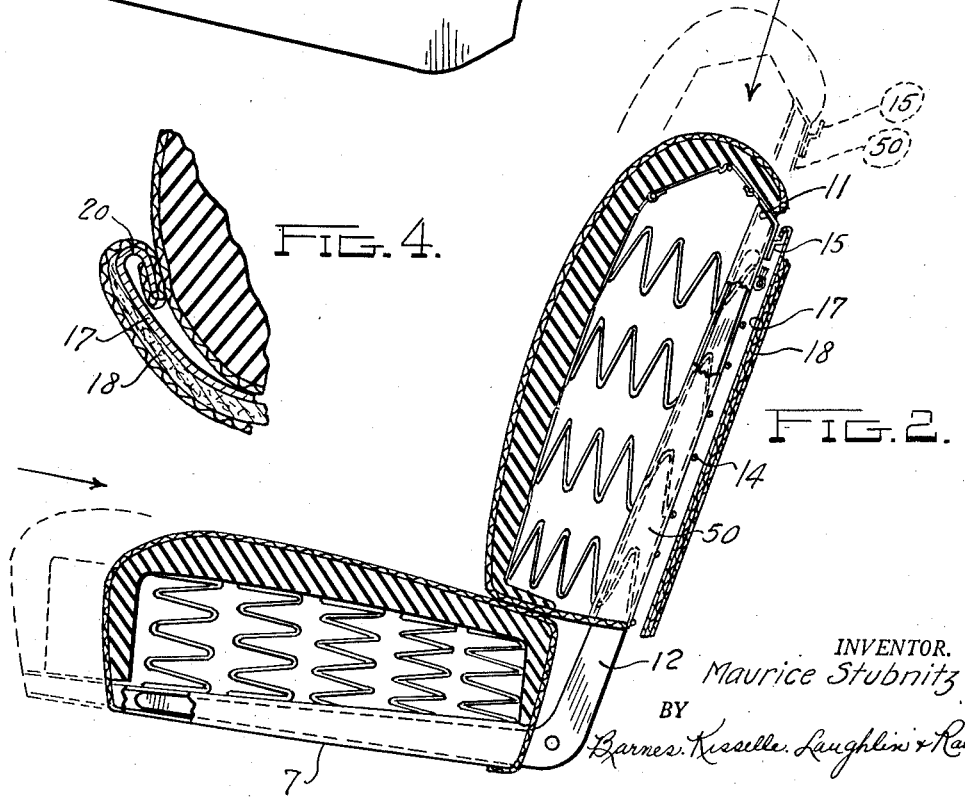
INVENTOR.
Maurice Stubnitz
BY
Barnes, Kisselle, Laughlin & Raisch
ATTORNEYS

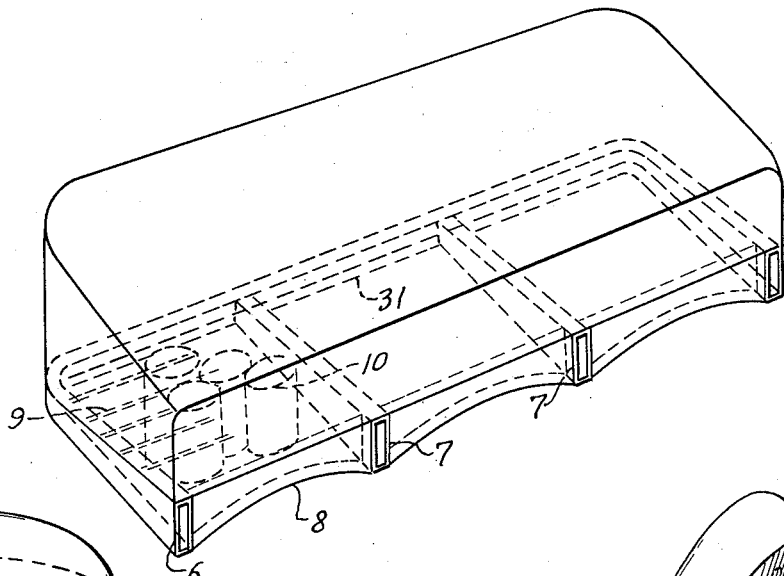
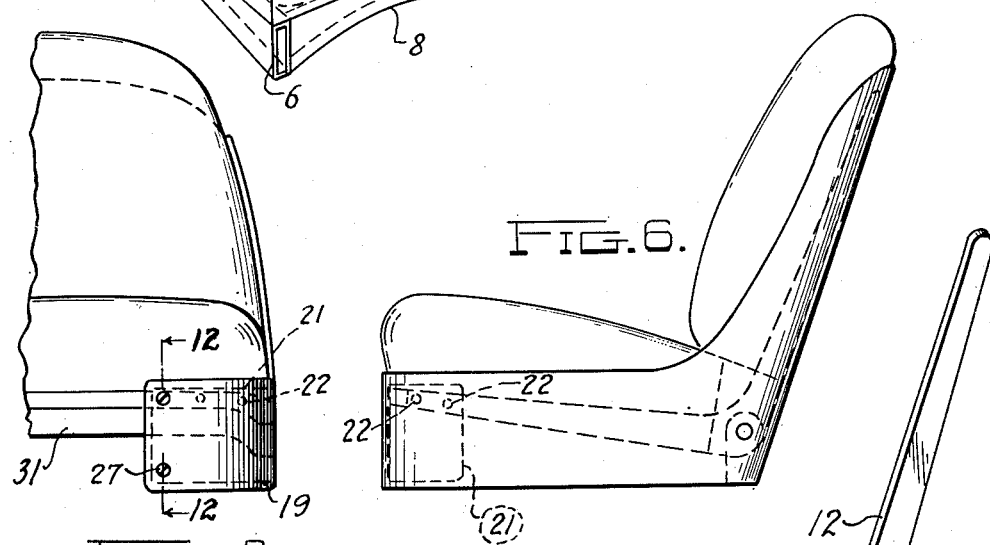
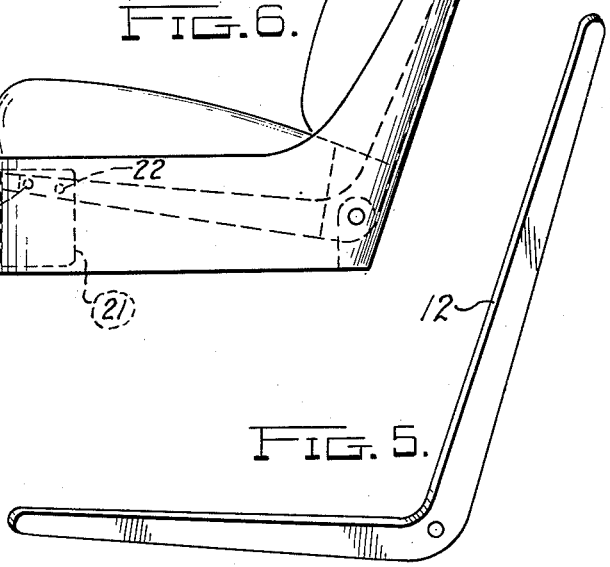

Dec. 26, 1950     M. STUBNITZ     2,535,463
AUTOMOBILE SEAT
Filed Oct. 23, 1947                     3 Sheets-Sheet 3
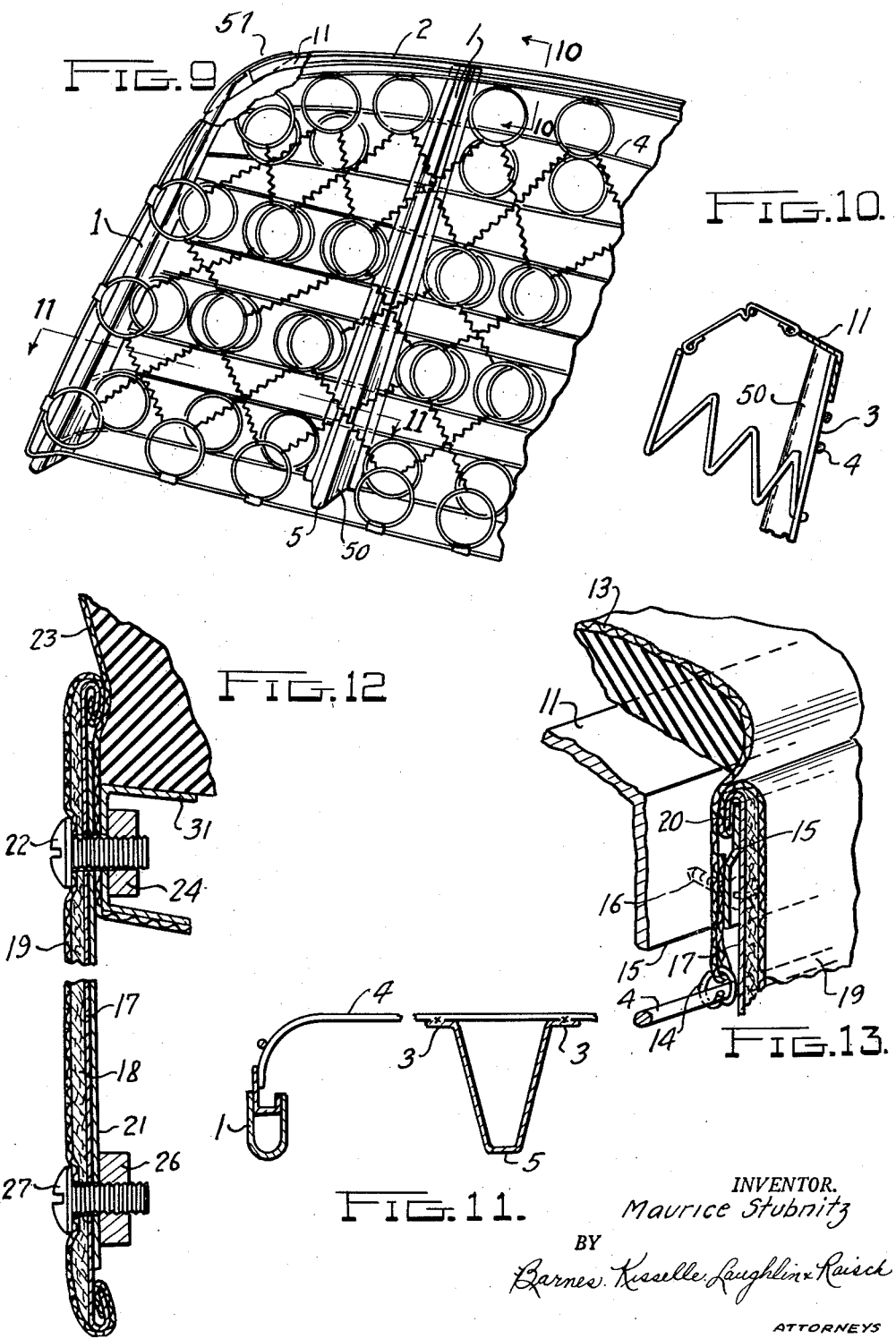
INVENTOR.
Maurice Stubnitz
BY
Barnes, Kisselle, Laughlin & Raisch
ATTORNEYS Patented Dec. 26, 1950

2,535,463

UNITED STATES PATENT OFFICE 2,535,463

AUTOMOBILE SEAT

Maurice Stubnitz, Adrian, Mich., assignor to Stubnitz-Greene Spring Corporation, Adrian, Mich., a corporation of Michigan Application October 23, 1947, Serial No. 781,671

3 Claims. (Cl. 155—184)

This invention relates to seats, automobile seats particularly. It is the object of the invention to provide a seat assembly in which the seat back and the seat bottom can be separately slid into place in the assembly so that either one may be easily separated from the other and removed. Another object of the invention is a trim assembly which permits the application of a unit trim panel with a minimum of work.

Another purpose of the invention is to reduce the total weight by incorporating structural members in cushion and back spring assemblies thereby permitting the use of light weight non-structural material for the outer shell or trim panel.

In the drawings:

Fig. 1 is a perspective of a seat.

Figs. 2, 3, and 4, are sections on the corresponding section lines of Fig. 1.

Fig. 5 is an elevation of one of the elbow like frame members.

Fig. 6 is an end elevation of the seat.

Fig. 7 is a perspective of the seat bottom.

Fig. 8 is a fragmentary front elevation of the seat.

Fig. 9 is a fragmentary perspective of the seat back viewed from the front.

Figs. 10 and 11 are sections taken on the corresponding section lines of Fig. 9.

Fig. 12 is a section taken on line 12—12 of Fig. 8.

Fig. 13 is a section taken on the line 13—13 of Fig. 1.

Fig. 14 is a detail view showing the upper corner of the seat back frame.

The seat back is made up of a frame comprising a plurality of upright channel members 1. The end channel members are secured to the top frame 2, by means of gusset strips 51. The middle upright members are V section channels 50 as shown in Figs. 9–12 having outstanding flanges 3 which are spot welded to the cross ties or wires 4. The bottom of the V cross section does not have the side walls meeting at a sharp apex, but has a bottom 5.

The seat bottom is shown in Figs. 2 and 7. A rectangular section tube 6 of U form, forms the front and end members of the seat bottom frame, which at the front is a channel 31 (see Fig. 12). Cross rectangular section tubes 7 extend from front to rear in the intermediate portions of the seat bottom. These are connected at the rear by arched rectangular section tubes 8, which are welded to the end members of the frame and the cross tubes 7. These tubes are arched to provide clearance for the propeller shaft tunnel and to allow heat to travel under the seat. The arches also provide toe room for the occupant of the rear seat. Wires 9 extend from the end members of the frame and are welded to the end members and the cross tubes 7. These support the upright helical springs 10. Referring to Fig. 2 it will be seen that the end members of the seat bottom frame and the cross tubes 7 taper from back to front, that is, these members are of diminishing cross section from rear to front.

The frame 2 of the seat back is provided at the top with an angle section strip 11, which is welded to the tops of the upright frame members. A plurality of elbow like assembly bars 12—four in number are provided for the assembly of the seat bottom and the seat back. These bars taper from the elbow to the ends. The seat bottom and the seat back cushions can be slid on the seat bars as shown in Fig. 2. The tapered bars slide into the tapered rectangular sections of the seat bottom and the V section channels of the seat back. The trim material 13 of the seat back can be stretched over the angle strip 11 and fastened to the top cross wire 4 by the hog rings 14 (Fig. 13). After this has been done a hook like strip 15 is secured to the back of the angle strip 11 by means of the screws 16.

The trim panel assembly has a base of light sheet metal such as aluminum. A padding material 18 is spread over this aluminum shell 17 and over this is spread the trimming material 19 which may be fastened to the turned over edges 20 of the sheet metal aluminum shell by means of an adhesive. After the seat bottom and seat back units have been shoved in place on the elbow members and the trim material clipped to cross wire 4 as shown in Fig. 13, the trim panel unit may be hooked over the strip 15 which is secured to the angle strip 11. The turned over edge of the panel assembly is simply shoved down into the groove formed by the offset in strip 15 (see Figs. 2 and 13). This secures the trim panel securely to the top of the seat back. The ends of the panel may be wrapped around the ends of the seat bottom as shown in Fig. 1, and as depicted in sections 3 and 4. An arched plate 21 is bolted by bolts 22 and nuts 24 to the front channel frame 31 (see Figs. 6, 8, and 12) and the aluminum shell 17 together with the trim covering 18 and 19 of that shell. Bolts 27 and nuts 26 bolt the trimming material 18 and 19 and the aluminum shell 17 to the corner plates 21 (see Fig. 12).

This completes the assembly and the trim in an expeditious and inexpensive way. The whole seat assembly may be easily mounted on a carriage on a track so that the seat, if it be a front seat can be shifted back and forth to adjust the position to the length of the driver. But the apparatus for accomplishing this need not be, and is not shown.

What I claim is:

1. A seat assembly in combination, a seat back frame having secured along the back near the top a strip with an offset portion to form a receiving groove, a seat bottom frame adapted to be assembled into a unit with the seat back frame, and a trim panel comprising a base of sheet material with the top edge turned over to form a hook, and trimming secured over the sheet material base and concealing the turned over edge, the said trimming panel assembly being secured to the seat assembly by hooking the turned over edge in the groove formed in the offset strip at the top of the seat back and the forwardly extending ends of the trim panel at the bottom lapping over the ends of the seat bottom and secured thereto.

2. A seat assembly having in combination, a seat back frame having secured along the back near the top a strip with an offset portion to form a receiving groove, a seat bottom frame adapted to be assembled into a unit with the seat back frame, and a trim panel comprising a base of sheet metal with the top edge turned over to form a hook, and trimming secured over the sheet metal panel, the said trimming panel assembly being secured to the seat assembly by hooking the turned over edge in the groove formed in the offset portion of said strip at the top of the seat back and the forwardly extending portions of the trim panel at the bottom lapping over the ends of the seat bottom and secured thereover, corner plates in the form of arched plates secured to the seat bottom and bolts and nuts for bolting turned over end portions of the trim panel to the corner plates, and the corner plates to the seat bottom frame.

3. A seat assembly having in combination, a seat back frame having at the rear along the top a hook like member, the seat bottom arranged to be assembled into a unit with the seat back frame and a trim panel comprising a sheet metal shell adapted to cover the seat back and extend around the ends of the seat back and seat bottom and be removably secured thereto, said shell having a covering of trim material and provided with hook means arranged to be engaged with the hook member on the seat back when the trim panel is secured to the seat unit formed by the seat back and seat bottom.

MAURICE STUBNITZ.

REFERENCES CITED

The following references are of record in the file of this patent:

UNITED STATES PATENTS

| Number | Name | Date |
| --- | --- | --- |
| 1,340,475 | Collar | May 18, 1920 |
| 1,677,434 | Dorton | July 17, 1928 |
| 1,814,789 | Dorton | July 14, 1931 |
| 1,918,618 | Stubnitz | July 13, 1933 |
| 1,940,636 | Stubnitz | Dec. 19, 1933 |
| 2,343,505 | Gedris | Mar. 7, 1944 |